March 4, 1969  J. E. DAIN ET AL  3,430,738
DRUM BRAKE ASSEMBLY
Filed Nov. 23, 1966
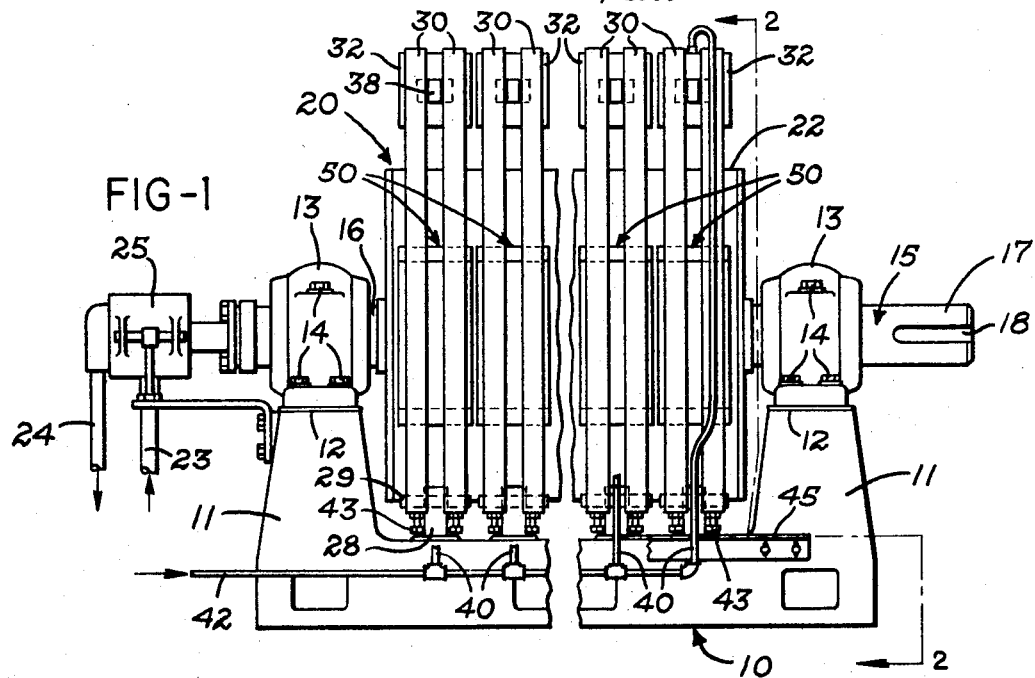
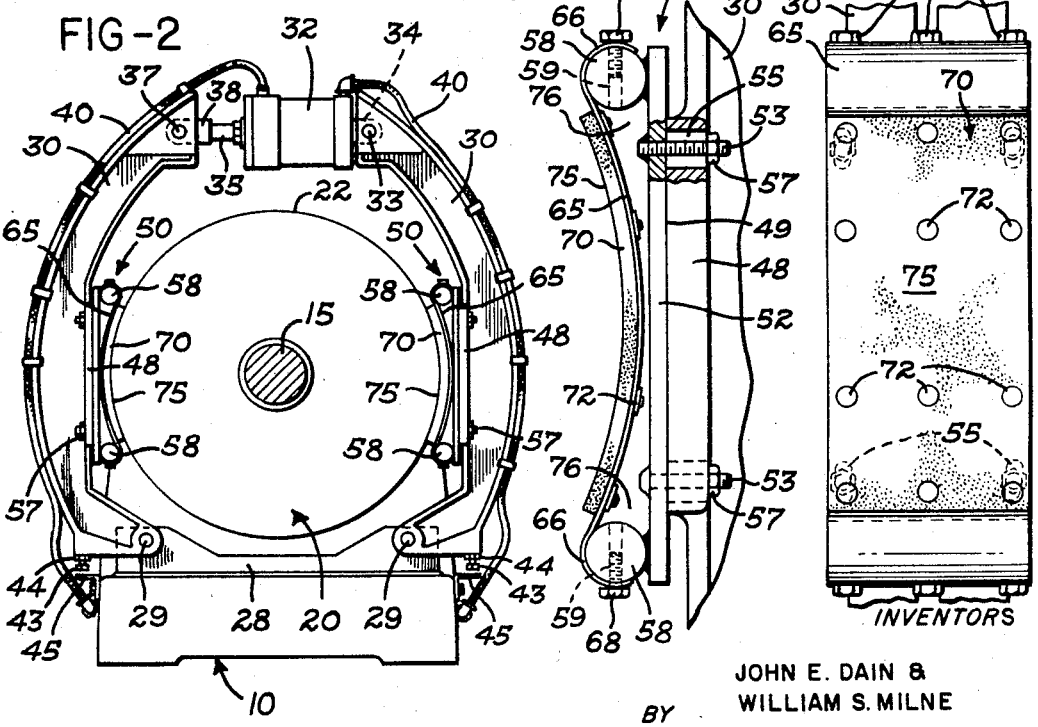
INVENTORS
JOHN E. DAIN &
WILLIAM S. MILNE
BY Marshal, Biebel, French & Bugg
ATTORNEYS 3,430,738
DRUM BRAKE ASSEMBLY
John E. Dain, Fulton, N.Y., and William S. Milne, Everett, Wash., assignors to The Black-Clawson Company, Hamilton, Ohio, a corporation of Ohio
Filed Nov. 23, 1966, Ser. No. 596,504
U.S. Cl. 188—75  7 Claims
Int. Cl. F16d 51/00, 69/00; B61h 13/36

ABSTRACT OF THE DISCLOSURE

A drum brake has a movable arm which supports the ends of a curved flexible band having a curved flexible pad of friction material secured thereto for conforming flexture therewith.

---

This invention relates to brakes wherein a drum having a cylindrical drag surface is supported for rotation usually either by a shaft connected to the member to be braked or by the member itself. Commonly, a pair of rigid brake shoes are pivotally supported either within the drum or on the outside of the drum in diametrically opposed relationship. A pad of friction material is rigidly secured to each shoe, and the shoes are connected by a fluid cylinder which is actuated to move the friction pads simultaneously into sliding friction contact with the drum surface for converting the mechanical friction energy into heat which is dissipated through the drum and brake shoes.

A typical drum brake for which the present invention is ideally suited, is one of the "clam-shell" type which is commonly used in conjunction with paper making and processing machinery, as for example, as the hold back brake for an unwinding roll of paper or other web material. Such a brake is adapted for continuous operation and commonly employs a series or gang of brake shoes spaced in opposed relationship along the outer cylindrical surface of a drum connected to the shaft supporting the unwinding roll. It is to be understood, however, that a brake constructed in accordance with the present invention may be used for braking other rotating masses, as for example, the braking of a vehicle wheel.

It has been determined that the rigidity of the brake shoes and the rigid mounting of the friction pads on the shoes produces localized high pressure spots in the friction pads and thereby prevents the obtaining of maximum braking efficiency in addition to producing concentrated wear and excessive heat in the localized spots. The situation is aggravated somewhat by the fact that the excessive heat produced by the localized pressure spots produces nonuniform expansion in the friction pads which further increases the concentration of pressure within the localized areas.

It is a primary object of the present invention to provide a brake assembly with a novel flexible support for the friction pads whereby the braking force is uniformly distributed over the entire contacting faces of the friction pads to obtain optimum brake efficiency and maximum service life from the pads.

Additional objects of the invention are to provide a brake assembly including a curved flexible band having end portions connected to the supporting shoe and supporting a friction pad of uniform thickness intermediate the end portions; to provide for an open space between the flexible support band and the shoe for the circulation of cooling air therebetween; to provide a novel support for each end portion of the flexible band whereby concentrated bending stress within the band is eliminated when the band flexes to produce uniform pressure contact between the friction pad and the drum surface; to provide for obtaining precise initial positioning between the friction pad and the drum; and to provide for obtaining maximum braking efficiency to minimize the size and cost of the drum brake assembly.

Other objects and advantages of the invention will be apparent from the following description, the accompanying drawing and the appended claims.

In the drawing—
FIG. 1 is a side elevation of a drum brake assembly constructed in accordance with the invention and with a center portion broken away;
FIG. 2 is a view of the brake assembly taken generally along the line 2—2 of FIG. 1;
FIG. 3 is an enlarged detailed view of one of the brake shoes shown in FIG. 2; and
FIG. 4 is a face view of the brake shoe shown in FIG. 3.

Referring to the drawing, which illustrates a preferred embodiment of the invention, FIGS. 1 and 2 show a brake assembly of the "clam-shell" type mentioned above and constructed in accordance with the invention. This assembly includes an elongated base 10 having upwardly projecting end portions 11 on which are formed flat coplanar surfaces 12. A bearing 13 is mounted on each surface 12 and is secured by screws 14 threaded into the corresponding end portion 11. A shaft 15 is rotatably supported by the bearings 13 and includes one tubular end portion 16 and one solid end portion 17 having a keyway 18 formed therein for coupling the shaft 15 to the shaft or member (not shown) which is to be braked.

A drum 20 is rigidly secured to the shaft 15 between the end portions 11 and is formed with a smooth outer cylindrical drag surface 22. Preferably, the drum is provided with internal passageways (not shown) for circulation of water or other cooling fluid supplied to and removed from the drum through the shaft end portion 16, which is connected to the fluid supply and return lines 23 and 24, respectively, through a rotary joint or gland member 25.

Referring to FIGS. 1 and 2, a series of parallel spaced support bars 28 are mounted on the base 10, and a pin 29 extends through each end of each bar for supporting a pair of parallel spaced curved or C-shaped arms 30 for pivotal movement on an axis parallel to the axis of the shaft 15. Each arm 30 has a generally H-shaped cross-sectional configuration to provide rigidity, and each pair of arms 30 is positioned in opposing relationship with a corresponding pair of arms on the opposite side of the drum 20.

A double acting fluid pressure cylinder 32, preferably pneumatic, connects the upper end portions of the arms 30 mounted on each bar 28. The connection includes a pin 33 extending through aligned holes formed within one pair of arms and within an intermediately spaced lug 34 extending from the pressure cylinder. The piston rod 35 extending from each cylinder 32 is pivotally connected to the upper portion of the opposing pair of arms by a pin 37 extending through aligned holes formed within the arms and within a fitting 38 mounted on the forward end portion of the piston rod.

Air is supplied to each of the cylinders 32 through a pair of conduits 40 extending to the cylinder along the outer surface of the corresponding arms 30 from a main air supply line 42. A screw 43 is threaded into the bottom portion of each arm and is provided with a lock nut 44 to form an adjustable stop which engages an angle member 45 mounted on the base 10 to limit the outward movement of the arm 30 when the piston rod 35 is extended.

Referring to FIG. 3, each arm 30 includes a vertically extending boss 48 forming an elongated flat surface 49. A brake shoe 50 is mounted on each surface 49 and includes a flat base plate 52 which is secured to the boss 48 by a series of threaded studs 53 welded to the base plate and extending through corresponding aligned slots 55 formed within the boss for receiving nuts 57. Thus each shoe 50 is adapted to be adjusted vertically relative to its supporting arm 30 simply by loosening the nuts 57 and sliding the base plate 52 on the surface 49.

Each shoe 50 includes a pair of parallel spaced cylindrical rods 58 which are welded to the base plate 52 and a series of three tapped holes 59 are formed within each rod 58. A concave band 65, preferably formed of steel or similar flexible material, extends between the parallel rods 58 and includes curved end portions 66 which extend partially around the outer surfaces of these rods and are secured thereto by machine screws 68 in threaded holes 69. The portion of band 65 between rods 58 is curved about a radius which is not less than and preferably slightly greater than the radius of the brake drum 20, for example a radius of the order of 16 inches for a drum 20 which is 30 inches in diameter.

A flexible lining or pad 70 of friction material having a uniform thickness is secured to each band 65 by a series of copper rivets 72. The curvature of each band 65 with respect to drum 20 as described is such that the inner friction face 75 of each pad conforms to the curvature of the surface 22 on the drum 20. As shown in FIG. 3, an air space 76 is defined between the back side of the concaved band 65 and the front flat surface of the base plate 52, satisfactory results having been obtained with a minimum clearance of the order of 1/16 inch between band 65 and plate 52. While the brake assembly illustrated in the drawing includes a pair of arms 30 supporting each brake shoe 50, it is to be understood that a single arm could be employed for supporting each shoe.

From the drawing and the above description, it can be seen that a drum brake assembly constructed in accordance with the present invention provides several desirable features and advantages. For example, by mounting each lining or pad 70 of friction material on a concave flexible band 65 extending between the support rods 58, each brake shoe is provided with a friction pad which can flex to conform to the precise configuration of the cylindrical drum surface. Thus when a braking force is applied by a cylinder 32 by actuating the corresponding cylinder 32, the braking force is uniformly distributed over the entire face 75 of each pad. This force distribution eliminates the concentration of pressure in localized spots on the face 75 and thus eliminates the cause for excessive heating and concentrated wear of the pad.

Another feature is provided by the mounting of the end portions 66 of each band 65 on the rods 58. That is, the forming of the end portions of the band to conform to the outer curved surface of the rods 58 enables the band 65 to flex without producing concentrated bending stresses within the band. The removable bolts 68 also provide for convenient and economical replacement of the pads 70. A further feature is provided by the adjustability of each shoe 50 relative to its pair of supporting arms 30. That is, by loosening the nuts 57, each shoe can be adjusted vertically during assembly so that the curvature of the face 75 is precisely concentric with the curvature of the drum surface 22. Thus it is unnecessary to require precise manufacturing tolerances in the construction of the arms 30 and their mounting relative to the axis of the shaft 15.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A brake assembly comprising a rotatable drum having a generally cylindrical surface, a rigid arm having opposite end portions, pivot means supporting one of said end portions of said arm, a curved flexible band having opposite end portions, a curved flexible pad of friction material secured directly to said band for conforming flexure therewith and having a curved face conforming to the curvature of said surfaces, support means rigidly connecting each said end portion of said band to said arm and arranged to support said band only at said end portions with the intermediate portion unsupported, and fluid cylinder means connected to the other said end portion of said arm for moving said band and said pad toward said drum to effect flexing of said band and said pad for uniformly distributing a friction drag force over said face to obtain optimum braking efficiency and maximum service life of said pad.

2. A brake assembly as defined in claim 1 wherein said support means for said band includes means forming a pair of spaced curved surfaces, said end portions of said band being wrapped at least partially around said surfaces to provide for flexing of said band without concentrating a bending stress within said band, and comprising means for removably securing said end portions of said band to said surfaces to provide for convenient and economical replacement of said pad.

3. A brake assembly as defined in claim 2 wherein said support means for said band includes a flat base member, said means forming said curved surfaces include a pair of parallel spaced cylindrical rods secured to said base member, and said securing means for said band include threaded holes formed within said rods, aligned openings formed within said end portions of said band, and screws extending through said openings into said holes.

4. A brake assembly as defined in claim 1 including means for adjustably positioning said band support means relative to said arm for precisely aligning said face of said pad with said surface of said drum.

5. A brake assembly comprising a rotatable drum having an external cylindrical surface, at least one pair of brake shoes spaced in diametrically opposed relationship adjacent said surface, a flexible band for each said shoe and having opposite end portions, a flexible pad of friction material secured to each said band between said end portions and having a curved face conforming to the curvature of said surface, at least one arcuate-shaped rigid arm supporting each said shoe and having spaced end portions, means mounted on each said arm and supporting said end portions of the corresponding said band, means pivotally supporting corresponding said end portions of said arms for arcuate movement of said pads towards and away from said surface, and fluid cylinder means connecting the corresponding opposite said end portions of said arms for moving said pads simultaneously towards said surface so that a friction drag force is applied against said surface and is uniformly distributed over said faces of said shoes.

6. A brake assembly as defined in claim 5 including a plurality of sets of diametrically opposing said shoes supported by corresponding said arms, one of said bands mounted on each said shoe and one of said pads mounted in each said band, a corresponding plurality of fluid cylinders connecting opposing said arms, and means for simultaneously actuating said fluid cylinders.

7. A brake assembly as defined in claim 6 including means for circulating a liquid through said drum for cooling said surface.

References Cited

UNITED STATES PATENTS

| | | | |
|---|---|---|---|
| 1,647,221 | 11/1927 | Geatty | 188—77 X |
| 2,677,441 | 5/1954 | Roberts | 188—77 X |
| 2,095,427 | 10/1937 | Williams | 188—259 X |
| 2,128,387 | 8/1938 | Wehr | 188—221.1 X |

FOREIGN PATENTS 971,745  3/1959  Germany.

DUANE A. REGER, *Primary Examiner.*

U.S. Cl. X.R.

188—221.1, 259